Aug. 12, 1958  K. B. THOMPSON  2,846,919
INTERFEROMETER

Filed April 27, 1954  4 Sheets-Sheet 2

INVENTOR.
KENNETH B. THOMPSON
BY
ATTORNEY.

Aug. 12, 1958 K. B. THOMPSON 2,846,919
INTERFEROMETER

Filed April 27, 1954 4 Sheets-Sheet 4

INVENTOR.
KENNETH B. THOMPSON.
BY
ATTORNEY.

United States Patent Office 2,846,919
Patented Aug. 12, 1958

2,846,919

INTERFEROMETER

Kenneth B. Thompson, Sierra Madre, Calif., assignor of one-half to Penn Optical and Instrument Co., Pasadena, Calif., a corporation of California Application April 27, 1954, Serial No. 425,908

15 Claims. (Cl. 88—14)

This invention relates to interferometers which utilize interference fringes from light beams to measure distances in terms of the wave length of the light.

The wavelength of monochromatic light is a fundamental and reproducible standard for establishing a unit length, and the wavelengths of certain colors of light, particularly of the highly monochromatic emission from mercury 198, are known a high degree of precision. Standard measures, such as the standard meter and its principal references, have frequently been calibrated by using interferometers which utilize wavelength as a measurement unit. However, the commercial use of such instruments in making direct measurements has been greatly restricted due to the highly precise construction required for previously known interferometers.

Instruments of this character have been previously known in which there was used a movable plane mirror, but care had to be taken that this planar reflecting surface always remained precisely parallel to an original position. Such an arrangement is found in the conventional Michelson interferometer, in which a light beam incident on a splitter mirror is divided into two mutually perpendicular beams. Each of these latter beams proceeds to a terminal mirror which reflects them back to the splitter mirror where they recombine and exhibit interference effects when the path lengths of the two beams are different. One of the terminal mirrors is made movable, and the distance this mirror is moved is determined by counting the fringes which move past a datum point at the splitter mirror as the terminal mirror is moved. Errors result unless the movable terminal mirror remains precisely parallel to its original position. This requirement has called for slideways which are flat and level to an accuracy of one half wavelength of the light being used. Some attempts to circumvent this requirement by providing retrodirective reflectors as terminal means have introduced a shift in phase relationship between the beams. The foregoing considerations have tended to limit the interferometer to use as a laboratory instrument for the measurement of short lengths, usually for secondary calibration purposes.

It is an object of this invention to provide an interferometer in which the light beams will remain correctly oriented and directed regardless of irregularities in the movement of the moving parts of the instrument. A related object is to enable an interferometer to be built to ordinary commercial structural tolerances, and still perform accurate measurements of length.

Another object is to provide means for indexing the interferometer with the boundaries of a linear dimension to be measured so that the accuracy of the instrument is not dissipated by parallax errors.

I carry out the invention by providing in an interferometer an optical system in which parallel incident light rays are directed to a splitter mirror of the type which splits these rays into a reflected beam and a transmitted beam. The splitter mirror itself is related to a retrodirective reflecting system which gives the reflected beam a 180° deviation regardless of the orientation of the retrodirective reflecting system relative to the incident light rays. Then the reflected beam will be accurately parallel to the incident rays regardless of the orientation of the retrodirective reflecting system.

According to a preferred feature, the splitter mirror forms part of the retrodirective reflecting system.

The transmitted beam emerges from the splitter mirror parallel to the incident ray. A related optional feature resides in the provision of a suitable optical reflecting system such as a rhombic reflecting system for displacing the transmitted beam sidewise. The properties of a rhombic reflecting system are such that rays emerging therefrom are accurately parallel to rays entering said system.

Another related optional feature resides in mounting both the retrodirective reflecting system, and the rhombic reflecting system if one is used, to the moving part of the interferometer. By means of this moving part, the path lengths of the reflected and transmitted beams are changed relative to each other. Then, since the angular orientation of the incident ray and the beams is independent of the orientation of the retrodirective reflecting system and of the rhombic reflecting system, they will be accurately directed without regard to the orientation of the moving parts.

As the moving part of the interferometer changes the path length of the reflected and transmitted beams, interference effects comprising migrating, countable fringes, are observed on the splitter mirror. The number of fringes counted is directly proportional to the distance the movable part is shifted, and therefore the distance moved is some determinable factor times the wavelength of the light.

Another optional feature which may be used if desired, resides in the provision of a means for indexing or aligning the interferometer with the boundaries of the linear dimension to be measured. Such means preferably comprise a fixed collimated light source and receiving telescope in combination with a carriage-mounted means for focusing rays from the collimator at a point along the locus of the center of a fiduciary ball provided on the moving part of the interferometer. This enables the point center of the fiduciary ball to be aligned with the carriage means.

The above and other features of the invention will be fully understood from the following detailed description and the accompanying drawings, of which.

Figures 1, 2, 5:
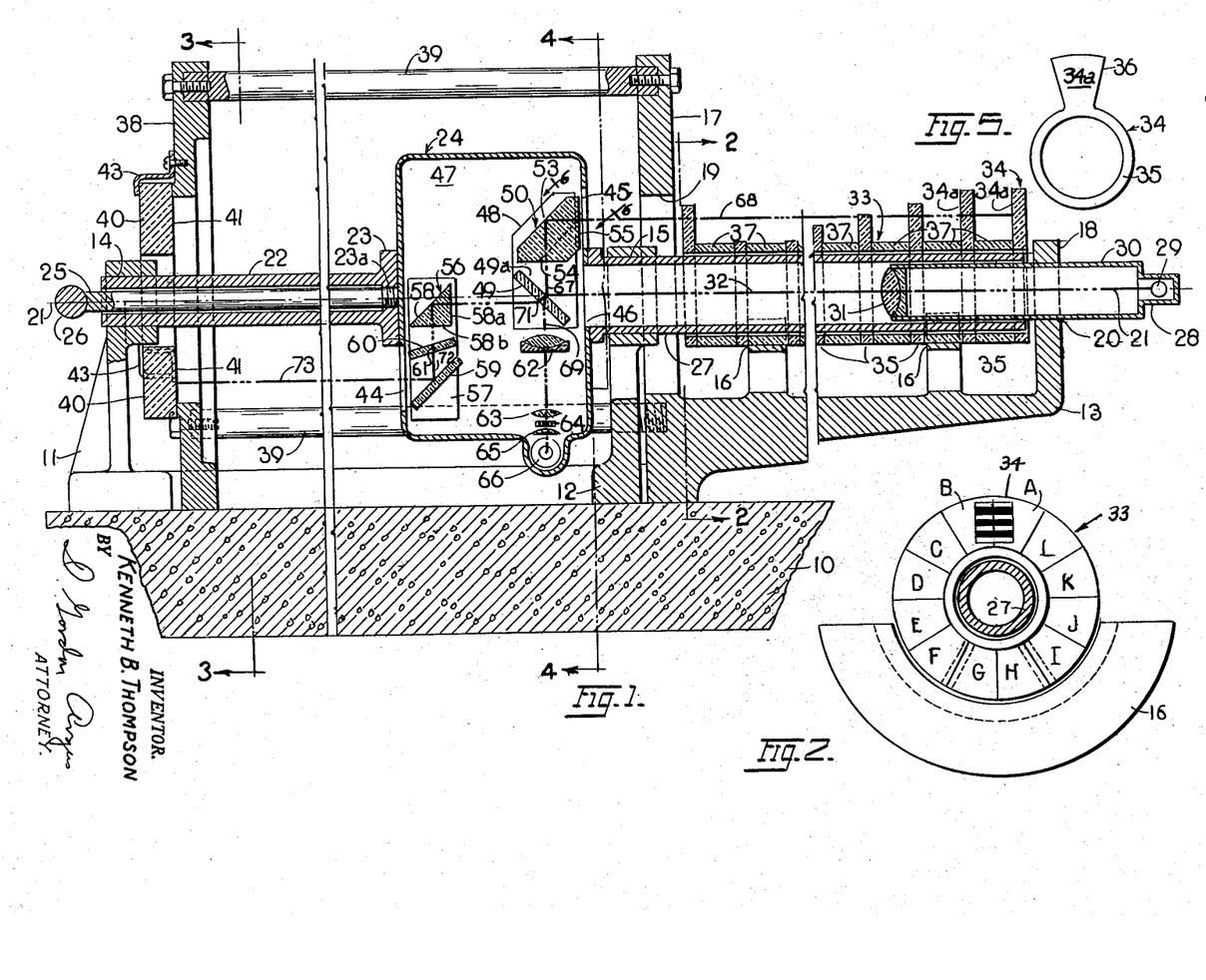
Fig. 1 is a side elevation, partly in cross-section, of an interferometer according to the invention.
Fig. 2 is a cross-sectional view taken at line 2—2 of Fig. 1.
Fig. 5 is a plan view of an etalon from Fig. 1.
Figure 3:
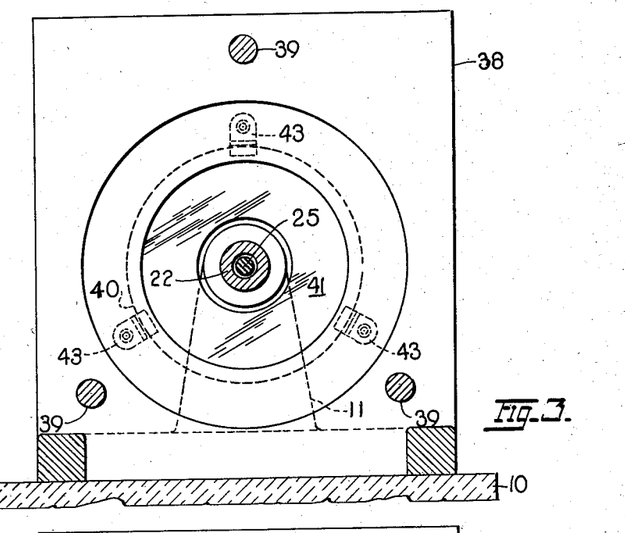
Fig. 3 is a cross-section taken at line 3—3 of Fig. 1.
Figure 4:
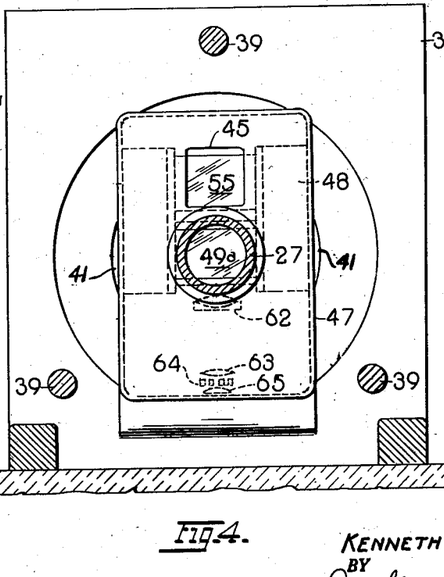
Fig. 4 is a cross-section taken at line 4—4 of Fig. 1.
Figure 6:
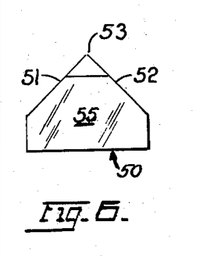
Fig. 6 is an end view of a prism from Fig. 1.

The interferometer of Fig. 1 is mounted to a base 10 of stable nature such as a block of granite. An end bearing mount 11, a central bearing mount 12, and an etalon mount 13 comprise the supporting structure for the interferometer, these mounts being securely fixed to the base. The end and central bearing mounts have aligned bearings 14, 15 respectively. The etalon mount has a number of upright support arms 16, and two flanges 17, 18 which have central holes 19, 20 respectively that are axially aligned with the bearings 14, 15 along the central axis 21 of the instrument.

A tubular shaft 22 fits slidably and rotatably in bearing 14 in the end bearing mount, and has a flange 23 at one end. There is a threaded hole 23a on the central axis of the instrument facing the tubular shaft. The flanged end of the tubular shaft is firmly attached to an optics housing 24, and a reference rod 25 is threaded into hole 23a so that it is cantilevered from the optics housing and passes through the tubular shaft 22 without touching the tubular shaft. A fiduciary ball 26, which is preferably precisely spherical and approximately ½ inch in diameter is formed on the end of the reference rod with its center on the central axis 21. It may have a highly polished surface for a purpose later to be discussed. A hollow shaft 27 is fixed to the opposite side of the optics housing from the tubular shaft 22, and is journaled in bearing 15 in the central bearing mount 12.

A collimator 28 is mounted to the base and projects through the hole 20 in the etalon mount, having a light-source 29 which produces light which is preferably monochromatic. A convenient light source is the emanation of mercury 198, said emanation being created by well-known means. This source is mounted in a tube 30, along with a conventional collimator lens 31 for directing parallel incident rays 32 through the hollow shaft 27.

An etalon assembly 33 comprises a plurality of fused quartz etalons 34 each with a ring section 35 and a sector-shaped reflecting section 36. Reflecting sides 34a are polished to a flat planar surface. These etalons are spaced apart by tubular spacers 37 of fused quartz, and the reflecting sections 36 are angularly spaced relative to each other in a helical pattern (see Fig. 2). The reflecting sides 34a are all precisely parallel to each other, and all are perpendicular to incident rays 32. The etalons and tubular spacers are optically contacted to each other and from a rigid assembly.

In practice it has been found that in order to construct an instrument capable of utilizing the high accuracy attainable with interferometric measurements, the etalons and spacers must have their contacting surfaces polished flat to a tolerance of less than one wavelength of light. The resulting flat surfaces then fit together so perfectly that in addition to the atmospheric forces, there are also large intermolecular forces holding them together. No cementing or other bonding means are then needed to give structural integrity to the etalon assembly. Such bonding means might tend to destroy the parallelism of the reflecting surfaces 34a.

The etalon assembly is supported by arms 16, and is not intended to be rotated. The hollow shaft 27 passes through the center of the etalon assembly and this shaft has a greater diameter than the light source tube 30 so that it can slide over the tube.

An end plate 38 is spaced from flange 17 by symmetrically disposed spacer rods 39. These spacer rods are made of a metal with a relatively low thermal coefficient of expansion, such as the well-known "Invar" metal. An annular mirror 40 with a fully reflecting optically flat surface 41 is held to the end plate by clamps 43. The reflecting surface 41 is accurately parallel to the reflecting surfaces 34a of the etalons and all these surfaces are therefore accurately perpendicular to the incident rays 32.

The optics housing 24 will now be described in detail. As stated above, one wall is fixed to the tubular shaft 22 and an opposite wall is fixed to the hollow shaft 27. The optics housing will therefore shift and rotate with the shafts. The reference rod and fiduciary ball will also shift and rotate with it. The optics housing has three windows 44, 45, 46. Window 44 is radially outward from the central axis 21 of the instrument, facing the annular mirror 40. Window 45 is radially outward from the central axis 21, facing the etalon assembly. Window 46 is on the central axis 21 in the wall adjacent the etalon mount, and opens into the hollow shaft 27.

The optics housing has a wall 47 to which a base plate 48 is cemented. A splitter mirror 49 having a semi-reflecting surface 49a of the type which transmits part, and reflects part, of the light incident thereon, and which has its semi-reflecting surface 49a on the side of the splitter mirror nearest the hollow shaft 27, is bonded to the base plate. The plane of the splitter mirror is perpendicular to the base plate 48, preferably so that it makes substantially a 45° angle with the parallel incident rays 32, although this angle may have other values than 45°. A roof prism 50 is also mounted to the base plate 47, and has two reflecting surfaces 51, 52 which are perpendicular to each other and to the splitter mirror 49. The intersection 53 of these surfaces is therefore also perpendicular to the splitter mirror. The roof prism's entry and exit faces 54, 55 respectively, make 45° angles with the plane of splitter mirror. Since the roof prism and splitter mirror are attached to the same base, their reflecting surfaces will always retain their perpendicular relationship, regardless of the position of the optics housing. It will be appreciated that the splitter mirror and reflecting surfaces 51 and 52 are mutually perpendicular, and make up a retrodirective reflecting system.

A totally reflecting prism 56 is bonded to another mounting plate 57 on the housing wall so that its reflecting face 58 is perpendicular to the plane of splitter mirror 49. The entry face 58a, and exit face 58b of prism 56 are perpendicular to each other, and each makes a 45° angle with the reflecting face 58. All the faces are perpendicular to the mounting plate 57. A fully reflecting mirror 59 is mounted perpendicular to the mounting plate 57, and parallel to the reflecting face 58 of the prism 56. Prism 56 and mirror 59 are held in fixed relationship to each other, by the mounting plate 57 and together make up a rhombic reflecting system.

A compensator plate 60 which comprises a plate of glass with parallel opposite planar surfaces is pivotally mounted to mounting plate 57 by means of a pin 61 between the mirror 59 and the prism 56.

Figure 7:
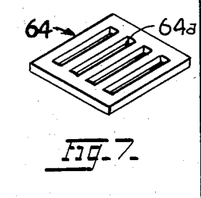
Fig. 7 is a perspective view of a grid from Fig. 1.

A collimator lens 62 is mounted to the optics housing beneath the splitter mirror 49. Below this collimator lens there is a double convex lens 63, a grid 64 (see Fig. 7) having slits or apertures 64a therethrough, and a collector lens 65, in that order. The latter lens causes rays to converge on a photo-sensitive tube 66, for example the GL–1P21 tube, which is a photo-multiplier.

The photo-sensitive or photo-multiplier tube may be connected to any desired type of counting mechanism which is responsive to periodic pulses from the photo-multiplier tube. Such a counter should be able to subtract as well as add. Such counters are well known, and since the counter forms no part of this invention, it will not be further described here.

The optical paths in the interferometer of Fig. 1 will now be described. In the interest of clarity, only the principal ray has been shown in the drawings; that is, the ray which passes through the center of the collimeter lens. It will be understood that this principal ray is representative of a "bundle" of rays, of which it is the central member. The collimator 28 sends parallel incident light rays 32 toward the splitter mirror 49. The semi-reflecting surface of the splitter mirror sends a reflected beam 67 upward as shown in Fig. 1 to the roof prism 50. This beam reflects from surfaces 51 and 52, and leaves the prism to pass through window 45 as rays 68 to the reflecting surface 34a of an etalon. Since the splitter mirror and roof prism make up a triple mirror, comprised of mutually perpendicular reflecting surfaces, the rays 68 and 32 are exactly parallel to each other regardless of irregular movements of the optics housing. The reflections in the roof prism are shown schematically as occurring at the intersection 53. It will be understood by persons familiar with such prisms that most of the rays reflect from both of the surfaces 51 and 52, such a double reflection being extremely difficult to show in a two-dimensional drawings. The etalons send the rays 68 directly back to the roof prism which reflects them downward to the splitter mirror at substantially the same point from which they initially departed. Some of these downwardly-directed rays pass through the splitter mirror, and emerge as rays 69 to be converged by the collimator lens 62 and the double convex lens 63. They then strike the grid 64, the collector lens 65, and the photo-multiplier tube 66.

In addition to providing a reflected beam, the splitter mirror transmits some of the incident rays 32. These rays form a transmitted beam which emerges from the splitter mirror as rays 71, which are accurately parallel with rays 32, since the refractive effect of the splitter plate serves to displace these rays sideward, but not to deviate them. They next enter the prism 56 where they are deviated 90° by the reflecting surface 58. The emergent rays 72 from the prism 56 pass through the compensator plate 60 and then strike mirror 59. Rays 73 leave the mirror 59 and proceed to the annular mirror 40 from which they are reflected back upon themselves to the mirror 59. Rays 73 which are reflected by annular mirror 41 and return to the mirror 59 are reflected upward through the compensator plate to the prism 56. From the prism, the rays pass through the splitter mirror 49 to its semi-reflecting surface 49a at substantially the same point from which they first emerged. Part of these rays are reflected downward by the reflecting surface and pass through the collimator lens, double lens, grid and collector lens, and impinge on the photo-multiplier tube, the same as rays 69.

The prism 56 and mirror 59 together make up a rhombic reflecting system in which the parallel reflecting surfaces are spaced from each other. Rays 73 are therefore parallel to rays 32, and also to rays 68, regardless of irregular movements of the optics housing.

Figure 8:
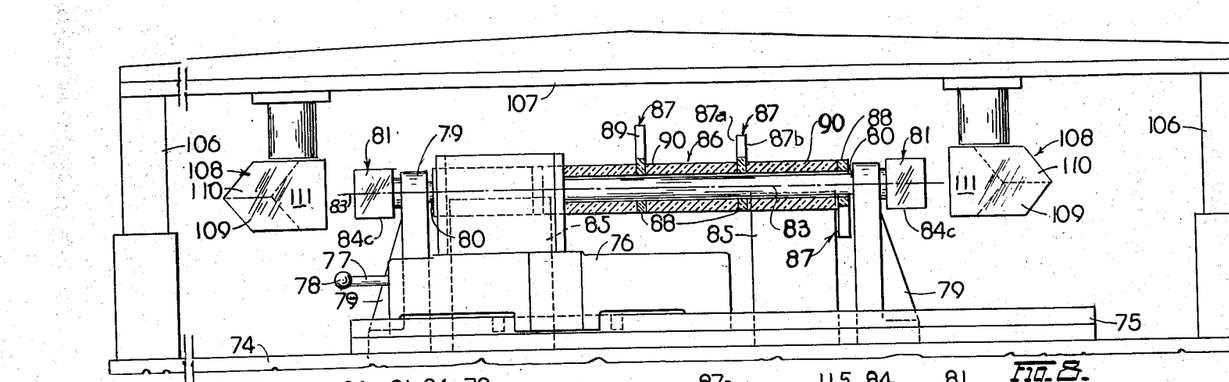
Fig. 8 is an elevation of another form of interferometer incorporating the invention.
Figure 9:
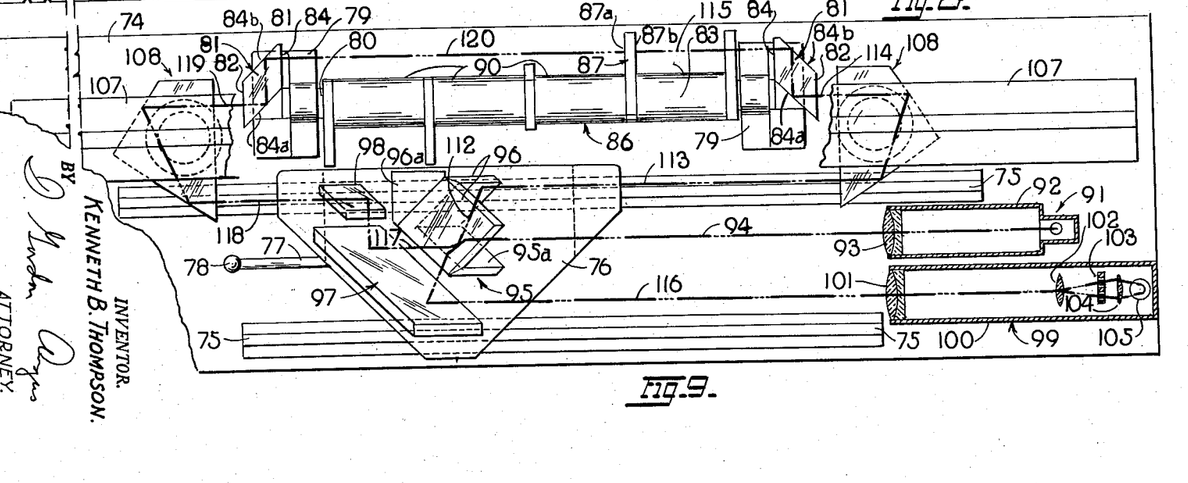
Fig. 9 is a plan view of Fig. 8.

Figs. 8 and 9 show another form of interferometer with an optical system according to the invention, which is mounted to a stable base 74. Carriage ways 75 are fixed to this base to guide a movable carriage 76. The carriage is provided with a reference rod 77 having a fiduciary ball 78 on its protruding end. This fiduciary ball is accurately spherical, highly polished, and preferably about ½ inch in diameter.

Bearing supports 79 are also mounted on the base. A central shaft 80 is journaled in these bearing supports. There is a rhomboid prism 81 on each end of the shaft outside the bearing supports. These rhomboid prisms project from the shaft so as to be aligned with each other. A first face 82 of each rhomboid prism is centered at the central axis 83 of the shaft 80 and is perpendicular thereto. A second face 84, of each rhomboid prism, which is parallel to face 82, is situated to one side of that central axis. Parallel reflecting surfaces 84a, 84b extend between opposite edges of the first and second faces. Faces 82, 84 and surfaces 84a and 84b are all perpendicular to a common plane, which may be bounding surface 84c of the prism. Reflecting surfaces 84a and 84b are precisely parallel to each other, and preferably both may make an angle of 45° with faces 82 and 84.

A pair of etalon mounts 85 support an etalon assembly 86. This etalon assembly is similar to etalon assembly 33 shown in Fig. 1, and comprises a plurality of fused quartz etalons 87 each having opposite reflecting surfaces 87a, 87b which are polished flat, and are accurately parallel to each other. Each individual etalon has a ring section 88 and a sector-shaped reflecting section 89. They are spaced apart by tubular spacers 90 of fused quartz, and their reflecting sections are angularly spaced relative to each other in a helical pattern. The reflecting surfaces are all mutually parallel, and are optically contacted to the fused quartz spacers to form a rigid assembly. This assembly surrounds the shaft 80, and is not intended to be rotated.

A collimator 91 is disposed in a tube 92, and has a collimating lens 93 therein for projecting parallel incident rays 94 into the interferometer. This light source is placed between the carriage ways, and may conveniently be mounted to the base. The reflecting surfaces 87a, 87b of the etalons are accurately perpendicular to the incident ray 94. It will be appreciated from the figures that rays 94 do not directly impinge on the etalons.

A splitter mirror 95 is mounted to the carriage, so as to make an oblique angle with rays 94. The dihedral angle between the plane of this splitter mirror and the carriage is conveniently made approximately 35°, and the intersection of that plane and the carriage approximately 45° with respect to the rays 94 as seen in Fig. 9. The splitter mirror has a semi-reflecting surface 95a on the side adjacent the light source. A pair of totally reflecting mirror surfaces 96, which are perpendicular to each other and to the splitter mirror, are mounted on the carriage by means of an adapter 96a to which they may be optically contacted or bonded. They stand on the side of the splitter mirror having the semi-reflecting surface 95a, and open in the direction from which the rays 94 approach the splitter mirror. Together, the splitter mirror and the pair of surfaces 96 comprise a retrodirective reflecting system, the reflecting surfaces of which are mutually perpendicular. It will be appreciated that the members of this system are mounted to the same base, so that they retain their relationship to each other regardless of irregular movement of the carriage.

A rhombic reflecting system comprising a first reflecting mirror 97 on the opposite side of the splitter mirror from the incident rays 94, and a second reflecting mirror 98, is mounted to the carriage. The mirrors 97 and 98 are parallel to each other, and since they are mounted to the same base, will retain that mutual relationship regardless of irregularity in the movement of the carriage. This rhombic reflecting system is provided to accommodate the transmitted beam.

A receiving telescope 99 is also mounted to the base. This telescope comprises a tube 100 with objective lens 101 for focusing parallel rays of light, a double convex lens 102, a grid 103, a collector lens 104, and a photo-multiplier tube 105 in that order.

Columns 106 are mounted to the base and support a beam 107 above etalon assembly. Two triple mirrors 108, each comprising three mutually perpendicular planar reflecting surfaces 109, 110, 111 are suspended from this beam. These surfaces may comprise mirrors, or may also be bounding sides of a prism having similarly disposed reflecting surfaces. These triple mirrors are disposed at an elevation level with the first faces 82 of the rhomboid prisms so that each opens onto one of the rhomboid prisms, and also one opens onto the surfaces 96 and the other onto mirror 98.

The optical path of the light through the interferometer of Fig. 8 begins at the collimator 91 which sends parallel incident rays 94 to impinge on the splitter mirror 95. The semi-reflecting surface 95a sends some of these rays upward as a reflected beam 112. This reflected beam proceeds to the pair of reflecting surfaces 96, and is reflected from them as rays 113 to the right hand triple mirror 108. Rays 114 emerge from the triple mirror 108 to pass into the right hand rhomboid prism 81. This prism displaces the rays to one side of the central axis of the etalon assembly and they emerge from the second face 84 of the prism as rays 115, to strike the right hand reflecting surface 87b of an etalon 87. Since all reflections of the reflected beam occur either in retrodirective reflecting systems or in rhombic reflecting systems, rays 94, 113, and 115 are all parallel to each other, regardless of any tilting of the carriage so long as the individual components of each reflecting system remain accurately aligned with each other. Ray 94 is fixed because the light source is mounted to the base independently of the carriage and comprises an external reference. Therefore the rays 113 and 115 are always parallel to a selected external reference.

The etalons, being perpendicular to the rays 115, turn these rays back upon themselves, so that they retrace their paths to the splitter mirror. Some of the returned rays pass downward through the splitter mirror and emerge therefrom to impinge on the first reflecting mirror 97. They then are reflected as rays 116 to the receiving telescope and the photo-multiplier tube.

A transmitted beam 117, which comprises the rays 94 which were not reflected by the splitter mirror, passes through the splitter mirror and impinges on the first reflecting mirror 97, from which they are reflected to the second reflecting mirror 98. Rays 118 are accurately parallel to incident rays 94 regardless of the carriage orientation, so long as mirrors 96 and 98 remain parallel to each other.

Rays 118 enter the left hand triple mirror 108, from which they are reflected as rays 119 to the left hand rhombic prism 81. These rays enter the first face 82, and are displaced by reflections with reflecting surfaces 84a and 84b so as to emerge as rays 120 which strike the surface 87a of the same etalon as is struck by rays 115. It will be appreciated that rays 94, 115 and 120 are all precisely parallel to each other, since both the reflected and transmitted beams encounter only triple reflecting, retrodirective reflecting systems, or rhombic reflecting systems.

The etalons reflect the rays 120 back upon themselves, and they retrace their paths to the splitter mirror, passing through it to the semi-reflecting surface at substantially the same point from which they originally departed. Some of the rays are reflected downward by the semi-reflecting surface, and impinge on the first reflecting mirror, from which they are reflected to the receiving telescope in the same manner as rays 116.

Figure 10:
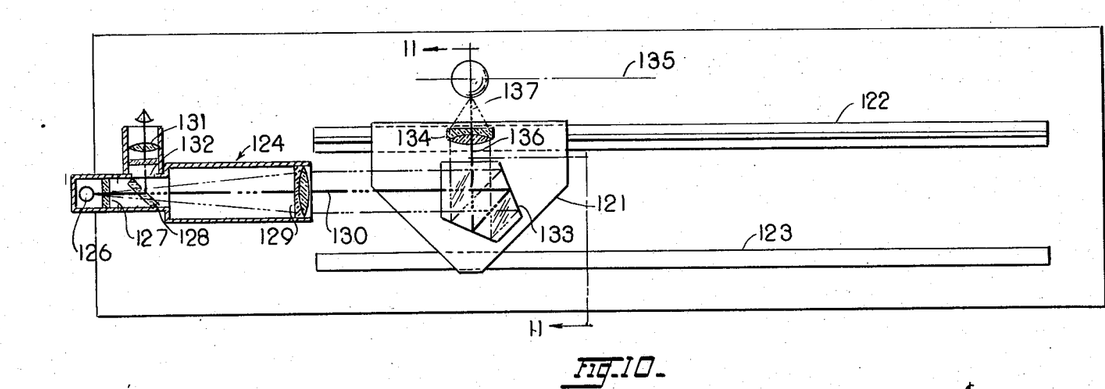
Fig. 10 is a plan view, partly in cross-section, of indexing means according to the invention.
Figure 11:
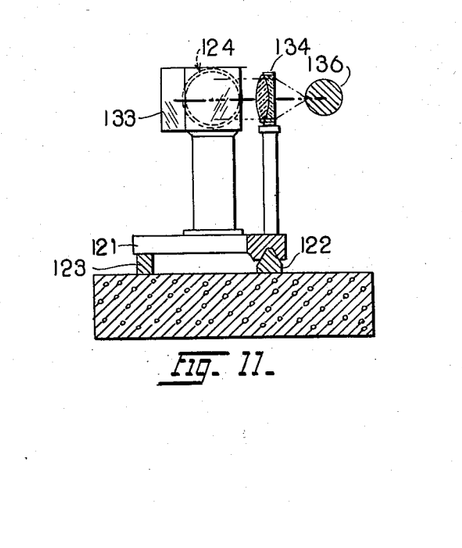
Fig. 11 is a view, partly in cross-section, taken at line 11—11 of Fig. 10.

Fig. 10 shows an indexing means for utilizing the fiduciary ball in measuring lengths with the interferometers. This indexing means is intended to be mounted to some separate piece of apparatus such as a precision screw, and will move with that separate piece of apparatus. Its object is to provide a means for aligning the fiduciary ball in the same relationship to the movable apparatus at the beginning and at the end of some movement or length to be measured.

This indexing means comprises a slide 121 which may be moved along V ways 122 and flat ways 123. These ways may be part of a jigbore or other device, the longitudinal movement of which is to be measured. A high-power auto-collimator 124 comprising a tube 125, an extended light source 126 therein, a reticle 127 with a reference mark thereon, a splitter mirror 128, and a collimating lens 129 furnishes parallel light rays 130. An eyepiece 131 is disposed at one side of the tube at a port 132 adjacent the splitter mirror 128. This collimator is permanently fixed to a base and does not move.

A means for deviating rays by 90°, which preferably will comprise a pentagonal prism 133, is attached to the slide 121, as is a lens 134 which is corrected for spherical aberration. This pentagonal prism has surfaces which need only be roughly perpendicular to the entering and departing rays, and which turn the rays by 90° by internal reflections. The principal focus of the lens lies on a line 135, which line is the locus of the center of the fiduciary ball of the interferometer. This locus coincides with the central axis 21 of the interferometer of Fig. 1.

The optical path in the indexing means comprises the parallel rays 130 from the collimator which pass to the pentagonal prism and make two total reflections therein to emerge therefrom as parallel rays 136 at right angles to rays 130. These rays converge from the lens 134 to a point on line 135. If the center of the fiduciary ball coincides with the focus of the rays, the rays 137 from the lens 134 will strike the ball normally and retrace their paths to the splitter mirror 127, where some are reflected to the eyepiece as shown in Fig. 10.

Figure 12:
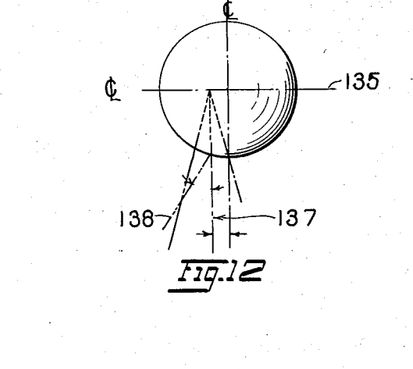
Fig. 12 is a fragmentary view of Fig. 10.

If the center of the fiduciary is to one side of the focus, the condition is as shown in Fig. 12, where rays 137 are not all reflected back on themselves, but instead will return in some other directions, such as rays 138.

The operation of the interferometer of Fig. 1 will now be described. The fiduciary ball is first set opposite some initial point from which a distance is to be measured. Such a condition is shown in Fig. 1, where the optics housing is placed to the right, and the window 45 is aligned so as to "see" parts of etalons A and B, which are the farthest from the housing. The etalons are lettered A, B, C, D, etc. to illustrate the helical pattern of the reflecting sections.

Window 44 will always "see" some part of annular mirror 40 because of that mirror's annular shape. Window 46 will always be open to incident light rays 32, since it is on the central axis 21 of the instrument.

The reflected beam takes the path as already described, and reflects from etalons A and B. When it is reflected back from the etalons, it passes through the splitter mirror 49 to the photomultiplier tube. Window 45 is superimposed on the view of Fig. 2 to show the "sight" of the etalons, and to indicate that in operation two adjacent etalons are to be seen through the window.

The transmitted beam 70 takes its described path to the annular mirror, from which it is reflected back to the splitter mirror. As has been described above, part of this beam also proceeds to the photomultiplier tube.

Examination of the rays reaching the photomultiplier tube by placing the eye in place thereof would reveal a field of sight such as is framed by window 45 in Fig. 2. The recombination of the split beams at the splitter mirror's semi-reflecting surface causes the familiar interference effects known as fringes and shown in Fig. 2 for convenience in illustration. These fringes are best observable at the focus of the collecting system; that is, at the photomultiplier tube, although they can also be observed on the splitter plate itself, and the light transmitted to the photomultiplier tube will itself have such a pattern.

To carry out a measurement, the fiduciary ball is moved by pulling the cylindrical shaft 22, which moves the optics housing 24 to the left. This shortens the path of the transmitted beam, by moving the optics housing toward the annular mirror, and lengthens the path of the reflected beam by moving the optics housing away from the etalons. According to well-known principles of light interference, the fringes will appear clearly in that part of the field corresponding to an etalon "seen" through window 45 which will give the reflected beam a total path length approximately equal to that of the transmitted beam. As the path lengths change the fringes migrate across the field.

It has been found that for reasonably monochromatic light, the path difference between the reflected and transmitted beam may be as great as three inches. However, when the path length difference is much greater, the fringes fade from that part of the field corresponding with the etalons which give the longer reflected beam path.

Therefore, as the optics housing is moved farther to the left, the path difference between the reflected beam which terminates at etalon A, and the transmitted path which terminates at annular mirror 40 becomes greater, while the reflected beam path terminating at etalon B becomes shorter, and therefore closer to the constant diminishing path length of the transmitted beam. For this reason, as the housing is moved, the fringes will fade from the part of the field corresponding to etalon A and become darker on the field corresponding to etalon B.

When the fringes have become too dim on the part of the field representing reflections from etalon A, the optics housing will be rotated so that window 45 "sees" etalons B and C, rather than etalons A and B. Then, as the fiduciary ball and optics housing are moved farther along, the fringes begin to fade in the part of the field representing rays reflected from etalon B, and become brighter in the field representing rays from etalon C. When the fringes fade in the part corresponding to etalon B, then the housing is rotated again so that window 45 "sees" talons C and D. This procedure is continued until the fiduciary ball has moved the distance to be measured, and is indexed opposite the end boundary of that distance.

As the fiduciary ball and the optics housing are moved, the dark fringes migrate across the field viewed from the photomultiplier. If a point-source of light source such as is shown is used, the fringes will have a straight line configuration, being the familiar "Twyman-Green" fringes. Each time a dark fringe passes across the photomultiplier tube, an impulse is generated therein. These impulses can be summed by the counter, and the elapsed distance is therefore known. In this instrument, a movement of the fiduciary ball through a distance equal to one-half of a wavelength will cause two fringes to migrate across a datum point in the photomultiplier tube. Of course, the fringes could be counted by other than electronic means, but in view of their large number, such other means would not be practicable.

The photomultiplier tube is sensitive only to whole fringes, in that it does not send out a partial pulse when only part of a fringe migrates across it. Therefore it may be convenient to provide means for starting and finishing the measurement at some unique position of a fringe, such as a centrally located dark or light area. This can be accomplished by calibrating the position of the compensator plate. Since its rotation about the pin 61 will produce small changes in path length through the glass, due to the refraction therein. A given amount of rotation of the glass compensator plate will result in a phase difference between the paths, thereby adjusting the fringe position in the field.

This happens because the length of the light path through the glass is determined by the angle of incidence of the light ray upon the glass surface. The shortest path results when the plate is perpendicular to the rays, and the path lengthens as the plate is tilted. Therefore the slight change in path length which results from rotating the compensator plate can be calibrated in terms of its rotation. Then by rotating the plate a known amount, the fringes can be brought to a position where the sight of the photo-multiplier tube is squarely on the dark or light region of a fringe, and the difference can be subtracted from or added to the measurement caused by the movement of the fiduciary ball.

If desired, a scanning device (not shown) may be incorporated in the counter so that the direction of movement of the fringes may be accounted for. This permits the counter to subtract as well as add, and allows the interferometer to be backed off in the event that it "overshoots" its measurement, or in the event that vibration of the instrument causes the same fringe to migrate back and forth across the photomultiplier tube.

It is important that the reflecting surfaces of the etalons be and remain precisely parallel to the annular mirror's reflecting surface 41. After the etalon assembly has been put together, and the end plate adjusted so that the reflecting surface 41 is once perpendicular to these reflecting surfaces 34a of the etalons, the relative angular positions remain fixed, for the Invar spacer rods 39 will expand the same amount with a given temperature change, and the annular mirror will therefore remain in proper alignment with the etalons.

For this reason, this instrument is substantially insensitive to temperature change. The effect of a rise in temperature is simply to move the annular mirror away from the etalons. This would tend to lengthen the path of the transmitted beam, and relatively shorten the path length of the reflected beam. However, the coefficient of thermal expansion of Invar metal is only $0.9 \times 10^{-6}$ per change in degree centigrade. This amounts to only about one-half wavelength change per 12 inch path per degree centigrade change. It is highly unlikely that the temperature in a room will change sufficiently during the short time necessary for the measurement of an elapsed distance with this instrument to seriously alter the path length of the transmitted beam. Therefore the only temperature limitation of this interferometer is that the temperature remain substantially constant during any given measurement.

It will be appreciated that this device is entirely independent of any mechanical alignment or zero setting. Therefore instrument dimension changes, such as might result from temperature changes in the room, are entirely immaterial to the instrument, except during a given measuring operation. The same reproducible measurement will be given by this instrument at any instrument temperature. Therefore the light wavelength can be used as a fundamental standard without observing the ambient temperatures.

The fringes on opposite sides of the middle of the field "seen" through window 45 should be in registration with each other so as to form straight lines as shown in Fig. 2. If the distance between the two reflecting surfaces differs by a fraction of a wavelength, then the fringe fields will not have such a coincidence or registration. Therefore in assembling the etalon assembly, the spacers will have fractional parts of a wavelength polished from them until their separation causes the fields to be synchronized. This synchronization is, of course, effective for only one wave length of light. If desired, compensator plates (not shown) could be placed next to each etalon to make the small changes in the path length to care for different wave lengths of light if such are to be used.

It will be appreciated that the instrument of Fig. 1 is also substantially insensitive to flexure of the shafts 22 and 27, and therefore the optics housing can be rotated in any manner. Due to the combination of rhombic and retrodirective reflections, there is no possibility that rays 68 and 73 can be otherwise than parallel to rays 32 and to each other. It will be appreciated that these rays 32, coming from a source rigidly mounted with respect to the annular mirror 40 will always be perpendicular to the annular mirror.

Flexure of the reference rod 25 is comparatively unimportant in making lateral measurements, since it is light and independently cantilevered from the optics housing. As soon as it is fixed in place, it bends due to its own weight and, since that weight is constant, the deflection is constant. Even if the optics housing changes its position slightly, the up and down movement of the fiduciary ball on the end of the reference ball will cause only a negligible linear movement.

It will be appreciated from an examination of Fig. 1 that the prisms 56 may be replaced, if desired, by a plane mirror in a position corresponding to the reflecting surface 58. However, the glass paths of the reflected and refracted beams should be approximately equal to give the best interference effects, and a larger compensator plate might then have to be installed. It will also be appreciated that instead of the roof prism 54, two fully reflecting mirrors could be placed in positions corresponding to reflecting surfaces 51 and 52 having the same considerations as to the glass path length in mind.

The interferometer shown in Fig. 8 operates in substantially the same manner as that of Fig. 1. The carriage is first placed near one end of the ways 75, so that the fiduciary ball is indexed with the initial point of the distance to be measured. The reflected and transmitted beams take the paths as already described to the opposite sides of an etalon. In actual measurements, these beams will proceed to a pair of adjacent etalons. Since these etalons are solid bodies, and the beams are reflected from opposite sides thereof, there is no possibility that the reflecting surfaces can ever be otherwise but parallel to each other.

Moving the carriage with the splitter mirror along the ways will change the length of the transmitted and reflected beam paths relative to each other. As the carriage is moved to the left, the reflected beam path lengthens, and the transmitted beam path shortens. As in the instrument shown in Fig. 1, the fringes will begin to fade from one of the etalons while they become more intense on the neighboring etalon. In order to switch among the etalon pairs, the central shaft 80 is rotated so that the second faces 84 of the rhomboid prisms 81 will be aligned with the reflecting surfaces of two of the desired etalons, so that rays 115 and 120 may be directed to any selected etalons.

The linear measurement is made by moving the carriage along ways until the fiduciary ball is opposite the index mark of the terminal end of the distance to be measured. While the carriage is moving, the fringes will be counted as they migrate across the photomultiplier tube. As in the instrument of Fig. 1, the light interference takes place when the two beams are recombined at the splitter mirror, and occurs because of the different path length they have traversed. The rays reflected to the receiving telescope have already undergone the interference at the splitter mirror and the fringes can be seen there, but the effect is best visible at the photomultiplier tube.

In both instruments shown there are provided the necessary parallel light rays and beams for proper operation of the instrument. However, it will be noted that in the instrument of Fig. 1, the annular mirror must be kept parallel to the etalons at all times, and this is a mechanical alignment problem. In the instrument of Fig. 8, both sides of the etalons are used for reversing the light paths. The opposite sides of an etalon are easily ground parallel to each other, and once they are made perpendicular to the incident light rays 94, there is no further alignment necessary. This greatly reduces the problem of assembling the instrument.

The elapsed distance moved by the optics housing of Fig. 1, or the carriage of Fig. 8, is equal to one fourth of the number of fringes counted, multiplied by the wavelength of the light which is used.

The type of fringe to be used in either embodiment of the interferometer is optional, and the choice will be made on the basis of whether the user prefers to count migrating rings, or moving straight-line fringes. If the light originates at an extended source so as to produce a cone of light, the resulting fringes will be the familiar Michelson's rings. These have a disadvantage in that they are not as sharply defined as the Twyman-Green fringes which result from the use of point source and which are described above.

The collimators shown in the Figs. 1 and 8 provide a point light source, and result in Twyman-Green or straight line fringes at the splitter plate. Since these fringes are clearer, and are of a nature such that they can be more conveniently put into registration between adjacent etalons, a point source of light will ordinarily be used.

Among previous interferometers, perhaps the best known, is the Michelson, in which parallel light rays strike a splitter mirror. This partial mirror then reflects light to one mirror perpendicular to the reflected beam, and transmits light to another mirror normal to the transmitted beam. It will be appreciated that these mirrors must be very precisely perpendicular to the beams incident upon them. Any obliquity will cause the reflected rays from the mirrors to return to some position on the splitter plate other than the position from which they left, and cause an error in the fringe count. This severe restraint on the orientation of the mirrors and the beams has caused the Michelson interferometer to remain a laboratory instrument of the greatest complexity and delicacy, preventing the direct use of the highly accurate direct measurement standard of wave length.

The extremely accurate alignment for the Michelson instrument has been made by polishing the slideways accurately flat to within one half wavelength. This has limited the lengths which can be directly measured since long slideways of such accuracy are extremely difficult to produce and use to provide accurate mirror alignment for the total measured distance. Some attempts have been made to alleviate this condition by providing retrodirective reflectors for terminating the beams, and returning them to the splitter mirror. However, these devices have the disadvantage of being sensitive to lateral movement, whereby lateral movement of the retrodirective reflectors causes the light interference to occur at different positions on the splitter mirror than the original point of reflection and transmission. If the interfering wavefronts are precisely plane and the monochromacity of the light source absolute, a lateral displacement can be tolerated without causing error or diminishing fringe contrast. No known source is absolutely monochromatic, and consequently lateral displacement will cause varying amounts of diminished fringe contrast to complete extinction of fringes. Tests with a cold mercury lamp, have shown that the apices of the terminal reflecting devices must be in virtual coincidence within approximately .01 inch in order for the fringes not to disappear. By utilizing plane mirrors to terminate the beam my instrument avoids such a difficulty.

One of the principal advantages of my instrument is the complete absence of any moving parts which must be aligned with some reference. The beam-terminating reflecting surfaces in the interferometer of this invention do not move at all. They remain stationary. The traveling portion of the interferometer is so constructed and arranged that light which is divided at the splitter mirror has no other possible path than to be parallel to the reference rays, and to return directly to the place on the splitter mirror from which it departed.

For instance, providing the splitter plate as a part of a retrodirective reflecting system guarantees that the reflected beam will proceed to the etalons so as to be parallel to the incident rays, and therefore always perpendicular to the etalons. The provision of a rhombic system for the transmitted beam gives a similar assurance for that beam.

The Michelson interferometer is operated by moving one of the mirrors away from the beam-splitter. In such a device there is no convenient or accurate means for indexing the instrument's initial and final positions except by providing absolute equality of path length for the reflected and transmitted beams. When the path lengths are equal and white light is sent into the interferometer, a clear field is viewed. A slight change of path length in either direction will change the color, and the well-known white-light fringes will be perceived. A characteristic yellow colored fringe precedes the clear field that denotes absolute equality of path length. Then in addition to this indexing means, it is necessary to switch back and forth between the white light needed for that purpose, and the monochromatic light needed for fringe-counting. This switching back and forth is a source of error, and also involves a great deal of time-consuming labor. After the Michelson instrument is initially indexed, measurement is carried out by counting fringes that move past some fiduciary point as the mirror is moved. Where the travelling fiduciary is a plane mirror, a correct fringe count results only if the initial and final angular positions of the travelling mirror are parallel. It is to be noted that with my ball fiduciary, the measurement references involve points in space rather than planes; accordingly, a valuable degree of freedom is afforded by the former.

In the device according to this invention, it is never necessary to compare path lengths in the interferometer, nor to index the device by providing paths of equal length, nor to switch to white light for any purpose. As will be appreciated from the foregoing description of operation, the measurement can be started at any desired point, and the fringes that migrate across the photo multiplier tube as the optics housing or the carriage is moved any desired distance to be measured can be counted. This unique and time-saving arrangement is possible due to the invariable parallelism of the critical parts of the interferometer, as well as to the insensitivity of the beam splitter to angular position.

According to this invention, a point in space (the center of the fiduciary ball) can be used as an index, and its movement may be measured by counting the migrating fringes, without the necessity for indexing the interferometer itself.

The indexing scheme shown in Fig. 10 is extremely sensitive to lack of coincidence between the focus of the rays 137 and the center of the fiduciary ball. As will be appreciated from an examination of Fig. 12, movement of the focus of the rays causes them to strike the surface of the ball other than normally, and thus there will not be an image of the rays returned to the eyepiece at the collimator. The limiting accuracy in a typical example may be calculated using a ¼ inch diameter fiduciary ball. Assuming that the eyepiece can detect deviation change of 4 seconds, then the angle between the normal to the fiduciary ball and the incident ray will be 2 seconds. This is equal to a lateral displacement of slightly more than one millionth of an inch, or approximately $\frac{1}{20}$ of a wavelength. Such an error is insignificant. Prism 133 is a constant deviation prism which will deviate rays incident thereon by 90°, regardless of the angle at which the rays strike the prism, and therefore regardless of any malalignment of the prism itself. In this manner, the light rays are always reflected precisely perpendicularly to the incident rays. This is superior to devices utilizing mirrors, since a malalignment of a mirror gives an error in the reflected beam equal to twice the angle of malalignment. This is a highly undesirable situation where measurements to millionths of an inch are being made in reliance on an indexing device, and makes mirrors unsuitable for such a use.

Also, by disposing the lens 135 over the V-ways, advantage is taken of the property of lenses in connection with rotation about its second nodal point, in that no deviation results. Therefore any error due to irregularity of the ways is substantially diminished.

By shortening one beam's path length at the same time the other beam's path is lengthened, the sensitivity of the instrument is doubled. In the comomn Michelson instrument, the movement of one of the terminal mirrors by a distance of one light wave changes the path length by a length of two wavelengths, and causes two fringes to be counted. In this instrument, the movement of the housing or carriage by this same amount shortens one beam by two wavelengths and lengthens the other by the same amount, thus causing four fringes to be counted. Therefore, twice the number of fringes will be counted in this instrument as in the conventional interferometer, with doubled accuracy in measurement resulting from the doubled count.

Therefore my interferometer improvements enable me to position the device accurately with respect to the limits of a length to be measured, and then to make a rapid measurement of the length without concern for the ambient temperatures. It also enables the interferometer to be assembled with fewer critical dimensions, all of the critical dimensions being adjustable initially when the instrument is installed. Thereafter, no caution need be had for angular regularity of the motion of the moving parts, as the optical system itself assures the proper relationships.

The interferometer is useful with many other mechanical or optical indexing means, and is not restricted to use with the indexing means of Fig. 10, which, however, provide a preferred and highly accurate means of indexing the position of this interferometer.

This invention is not to be limited by the embodiments shown in the drawings and described in the description, which are given by way of example and not of limitation, but only in accordance with the scope of the appended claims.

I claim:

1. An interferometer comprising: a base; a collimating light source having a reference axis along which it projects light rays; carriage means mounted to said base and reciprocably movable in a direction parallel to said reference axis; a planar splitter mirror having the property of reflecting first portion and transmitting a second portion of light rays incident thereon from said light source; said splitter mirror being mounted to said carriage so as to intercept said reference axis at an oblique angle thereto; a pair of planar mirrors mounted to said carriage at positions which are laterally spaced from said reference axis, the said three mirrors being mounted mutually perpendicular to each other so as to form a triple reflection, retrodirectively reflecting system wherein said first portion of light is reflected by the said retrodirectively reflecting system along a first path which is initially parallel to and laterally spaced from said reference axis; first planar terminal mirror means fixed to said base in a plane perpendicular to said reference axis for reversing the direction of said retrodirectively reflected rays so that the said rays retrace their route to the said retrodirective reflecting system; the second portion emerging from said splitter mirror along a second path which is initially parallel to said reference axis; second planar terminal mirror means fixed to said base in a plane perpendicular to said reference axis for reversing the direction of rays in said second path so that they retrace their route to the splitter mirror, the light in the two paths recombining at the splitter mirror, thereby to exhibit countable interference effects as a function of change in the lengths of the first and second paths caused by movement of the carriage along said axis.

2. An interferometer according to claim 1 in which rhombic reflecting means are mounted to said carriage to receive said second portion of light rays so that the second path emerges from the rhombic reflecting means initially parallel to and displaced laterally from said reference axis.

3. Apparatus according to claim 1 in which rhombic reflecting means are mounted to said carriage to receive said second portion of light rays, said rhombic reflecting means comprising: first mirror means mounted to said carriage in the path of said second portion of light rays and disposed at an oblique angle to said reference axis, and second mirror means mounted to said carriage parallel to said first mirror means and laterally spaced therefrom to receive light reflected from said first mirror means and reflect said light in a direction parallel to said reference axis.

4. Apparatus according to claim 3 in which a flat, transparent compensator plate is pivotally mounted to said carriage so as to intersect light rays in said second path, pivoting of the compensator plate varying the length of the second path which the second portion must travel.

5. An interferometer comprising: a base; a collimating light source having a reference axis along which it projects light rays; bearing means on said base; carriage means mounted in said bearing means so as to be rotatably movable and also reciprocably movable in a direction parallel to said reference axis; a planar splitter mirror having the property of reflecting a first portion and transmitting a second portion of light rays incident thereon from said light source; said splitter mirror being mounted to said carriage so as to intercept said reference axis at an oblique angle thereto; a pair of planar mirrors mounted to said carriage at positions which are laterally spaced from said reference axis, the said three mirrors being mounted mutually perpendicular to each other so as to form a triple reflection, retrodirectively reflecting system wherein said first portion of light is reflected by the said retrodirectively reflecting system along a first path which is initially parallel to and laterally spaced from said reference axis; a plurality of first planar terminal mirror means fixed to said base in a plane perpendicular to said reference axis for reversing the direction of said retrodirectively reflected rays so that the said rays retrace their route to the said retrodirective reflecting system, each of said first terminal mirror means being disposed at a different axial position, so that some one of said first terminal mirror means receives said first portion irrespective of the angular position of the carriage, the second portion emerging from said splitter mirror along a second path which is initially parallel to said reference axis; second planar terminal mirror means fixed to said base in a plane perpendicular to said reference axis for reversing the direction of rays in said second path so that they retrace their route to the splitter mirror, said second mirror means being annular and centered on said axis so as to receive said second portion irrespective of the angular position of the carriage, the light in the two paths recombining at the splitter mirror, thereby to exhibit countable interference effects as a function of change in the lengths of the first and second paths caused by movement of the carriage along said axis.

6. Apparatus according to claim 5 in which fiduciary means are attached to said carriage for determining the position of the carriage.

7. An interferometer comprising: a base; a collimating light source having a reference axis along which it projects light rays, a pair of bearing means on said base; carriage means comprising an optics housing, and two coaxial shafts mounted to opposite sides of the housing, one in each of said bearing means, one of said shafts being hollow and opening into the housing, said hollow shaft receiving the light rays from the light source, said carriage means thereby being mounted to said base so as to be rotatable and also reciprocably movable in a direction parallel to said reference axis; a planar splitter mirror having the property of reflecting a first portion and transmitting a second portion of light rays incident thereon from said light source; said splitter mirror being mounted to said optics housing so as to intercept said reference axis at an oblique angle thereto; a pair of planar mirrors mounted to said optics housing at positions which are laterally spaced from said reference axis, the said three mirrors being mounted mutually perpendicular to each other so as to form a triple reflection, retrodirectively reflecting system wherein said first portion of light is reflected by the said retrodirectively reflecting system along a first path which is initially parallel to and laterally spaced from said reference axis; a plurality of first planar terminal mirror means fixed to said base in a plane perpendicular to said reference axis for reversing the direction of said retrodirectively reflected rays so that the said rays retrace their route to the said retrodirective reflecting system, each of said first terminal mirror means being disposed at a different axial position, and each exclusively covering a different sector around said axis so that some of said first terminal mirror means receives said first portion irrespective of the angular position of the carriage, the second portion emerging from said splitter mirror along a second path which is initially parallel to said reference axis; second planar terminal mirror means; cantilever means mounting said second terminal mirror means to said base in a plane perpendicular to said reference axis so that said second terminal mirror means reverses the direction of rays in said second path so that they retrace their route to the splitter mirror, the light in the two paths recombining at the splitter mirror, thereby to exhibit countable interference effects as a function of change in the lengths of the first and second paths caused by movement of the carriage along said axis.

8. Apparatus according to claim 7 in which rhombic reflection means are mounted to said optics housing to receive said second portion of light rays, said rhombic reflecting means comprising: first mirror means mounted to said optics housing in the path of said second portion of light rays and disposed at an oblique angle to said reference axis, and second mirror means mounted to said optics housing parallel to said first mirror means and laterally spaced therefrom to receive light reflected from said first mirror means and reflect said light in a direction parallel to said reference axis.

9. Apparatus according to claim 8 in which the first terminal mirror means comprise sector-shaped etalons, in which the second terminal mirror means comprises an annular mirror surrounding one of said shafts, and in which the cantilever means comprises a plurality of rod-like members of identical thermal coefficient of expansion connected to said mirror and to said base.

10. Apparatus according to claim 9 in which the shaft which does not receive light from the light source is also tubular, and a rod with a fiduciary ball on its tip is attached to the optics housing and passes through said shaft to protrude beyond the same to serve as indexing means.

11. Apparatus according to claim 9 in which the light source is attached to the base.

12. An interferometer comprising: a base; a collimating light source having a reference axis along which it projects light rays; carriage means mounted to said base and reciprocably movable in a direction parallel to said reference axis; a planar splitter mirror having the property of reflecting a first portion and transmitting a second portion of light rays incident thereon from said light source, said splitter mirror being mounted to said carriage so as to intercept said reference axis at an oblique angle thereto; a pair of planar mirrors mounted to said carriage at positions which are laterally spaced from said reference axis, the said three mirrors being mounted mutually perpendicular to each other so as to form a triple reflection, retrodirectively reflecting system wherein said first portion of light is reflected by the said retrodirectively reflecting system along a first path which is initially parallel to and laterally spaced from said reference axis; first planar terminal mirror means fixed to said base in a plane perpendicular to said reference axis for reversing the direction of said retrodirectively reflected rays so that the said rays retrace their route to the said retrodirective reflecting system; the second portion emerging from said splitter mirror along a second path which is initially parallel to said reference axis; second planar terminal mirror means fixed to said base in a plane perpendicular to said reference axis for reversing the direction of rays in said second path so that they retrace their route to the splitter mirror, the light in the two paths recombining at the splitter mirror, thereby to exhibit countable interference effects as a function of change in the lengths of the first and second paths caused by movement of the carriage along said axis; said terminal mirror means being fixed to a mount so as to be spaced laterally from said reference axis, and a retrodirectively reflecting system disposed in each of said paths to laterally displace the light and reverse its direction to impinge on the said terminal mirror means.

13. An interferometer according to claim 12 in which rhombic reflecting means are mounted to said carriage to receive said second portion of light rays so that the second path emerges from the rhombic reflecting means initially parallel to and displaced laterally from said reference axis.

14. An interferometer according to claim 12 in which said terminal mirror means comprise a plurality of axially spaced etalons disposed in a spiral array on said mount, and in which said mount is provided with a pair of rhombic reflecting systems one being disposed in each path, said rhombic systems being rotatable so as to direct light in the respective paths to a selected one of said etalons.

15. An interferometer according to claim 14 in which each of said rotatable rhombic systems comprises a prism having parallel, spaced reflecting surfaces, said prisms being journaled to said mount.

References Cited in the file of this patent
UNITED STATES PATENTS

| | | |
|---|---|---|
| 2,239,469 | Reason | Apr. 22, 1941 |
| 2,402,856 | Turrettini | June 25, 1946 |
| 2,466,015 | Ewing | Apr. 5, 1949 |
| 2,571,937 | Peck | Oct. 16, 1951 |
| 2,583,596 | Root | Jan. 29, 1952 |
| 2,604,004 | Root | July 22, 1952 |